United States Patent [19]
Hamamoto et al.

[11] Patent Number: 4,677,026
[45] Date of Patent: Jun. 30, 1987

[54] RESIN COMPOSITION FOR SEALING ELECTRONIC PARTS, AND HYDRATION-RESISTANT MAGNESIA POWDER AND PROCESS FOR PREPARATION THEREOF

[75] Inventors: Toshikazu Hamamoto; Motojirou Aoi, both of Hirakata; Kozaburo Yoshida; Yasuhiko Toda, both of Ube, all of Japan

[73] Assignee: Ube Industries, Ltd., Yamaguchi, Japan

[21] Appl. No.: 885,083

[22] Filed: Jul. 14, 1986

[30] Foreign Application Priority Data

Jul. 17, 1985 [JP] Japan .............................. 60-157716
Jul. 17, 1985 [JP] Japan .............................. 60-157717

[51] Int. Cl.$^4$ .......................... B32B 9/00; B05D 7/00
[52] U.S. Cl. .................................. 428/404; 427/213; 427/215; 106/306
[58] Field of Search .............................. 427/213–215; 106/306; 428/404

[56] References Cited

U.S. PATENT DOCUMENTS 3,947,373  3/1976  Sobajima et al. ............... 524/433
4,547,536  10/1985  Nabors ............................ 524/433
4,563,488  1/1986  Minami et al. ................... 524/433
4,585,673  4/1986  Sigai ................................ 427/213

Primary Examiner—Lewis T. Jacobs
Attorney, Agent, or Firm—Burgess, Ryan & Wayne

[57] ABSTRACT

Disclosed is a resin composition for sealing electronic parts, which comprises a thermosetting resin and, incorporated therein, high-purity magnesium oxide. A hydration-resistant magnesia powder having the particle surfaces covered with a continuous and uniform coating of silica is advantageously used as the magnesium oxide. This hydration-resistant magnesia powder is prepared by introducing a heated vapor of an organic silicate compound into a reactor of a fluidized bed of magnesia powder heated at 100° to 600° C. so that the concentration of the organic silicate compound is 1 to 20 mole %, and precipitating a coating of silica on the surfaces of magnesia particles by thermal decomposition and/or hydrolysis of the organic silicate compound on the surfaces of magnesia particles.

6 Claims, No Drawings

RESIN COMPOSITION FOR SEALING ELECTRONIC PARTS, AND HYDRATION-RESISTANT MAGNESIA POWDER AND PROCESS FOR PREPARATION THEREOF

BACKGROUND OF THE INVENTION

1. Field of the Invention

The present invention relates to a resin composition for sealing electronic parts, which is excellent in thermal conductivity and metal abrasion resistance. Furthermore, the present invention relates to a magnesia powder in which the hydration resistance is highly improved by covering the surfaces of particles of the magnesia powder with a uniform coating of silica, and a process for the preparation thereof.

2. Description of the Related Art

The method for resin-sealing electronic parts such as semiconductors, resistors, condensers and coils with thermosetting molding materials is vigorously adopted in these years. The requirement for the reliability of each electronic part is increasing and hence, improvements of characteristics of sealants are eagerly desired. For example, the degree of integration of semiconductors is increased and the quantity of heat generated is increased with increase of the integration degree, and therefore, the heat dissipation of resin-sealed electronic parts becomes a problem. For solving this problem, use of a sealant having a high thermal conductivity is desired.

From the economical viewpoint and in view of heat resistance, moisture resistance and adhesion, in most of conventional sealants, an epoxy resin is used as the thermosetting resin and silica powder is added as an inorganic filler for improving thermal conductivity or mechanical strength. Most of available silica powders are composed of crystalline silica or fused silica. Resin-sealing materials comprising these silica powders, however, are still defective in that the thermal conductivity is not sufficient to seal a highly integrated electronic part having a large quantity of generated heat. Furthermore, since the hardness of silica powder is high, a resin-sealing material comprising silica powder wears a molding machine or mold at the transfer molding or injection molding, and this sealing material is not suitable for the long-period operation. Therefore, development of an improved a resin-sealing material is desired.

Magnesia is excellent in heat resistance, thermal conductivity and electrically insulating property and a high-density sintered body of magnesia has a high transparency. By dint of these characteristics, utilization of magnesia powder as the material of fillers or magnesia ceramics has been examined. However, magnesia powder is practically used only as a material of heat-resistant magnesia ceramics such as a crucible or a protecting tube of a thermocouple. The reason is that magnesia is poor in the hydration resistance and especially in the powdery state, magnesia is readily hydrated by water contained in air and converted to magnesium hydroxide, resulting in drastic degradation of characteristics. As means for coping with this hydration, there has been adopted a coupling treatment using such a coupling agent as 3-aminopropyltriethoxysilane, phenyltrimethoxysilane or 3-methacryloxypropyltrimethoxysilane.

However, even if this coupling treatment is carried out, magnesia powder having a sufficiently high hydration resistance cannot be obtained, and magnesia powder which has been subjected to the coupling treatment cannot be used as a filler or the like. Moreover, the coupling treatment requires complicated steps of filtration, drying, rough pulverization and calcination, and the treatment is very expensive.

SUMMARY OF THE INVENTION

Under this background, we made research and as the result, it was found that when high-purity magnesium oxide powder is used as the inorganic powder, the thermal conductivity and metal abrasion resistance and the reliability to the performance of an obtained electronic part are highly improved. We have now completed the present invention bases on this finding.

Furthermore, in order to overcome the above-mentioned difficulties, the present invention is to provide a magnesia powder having a high hydration resistance and a process for simply preparing this magnesia powder having a high hydration resistance.

More specifically, in accordance with a first aspect of the present invention, there is provided a resin composition for sealing electronic parts, which comprises a thermosetting resin and, incorporated therein, high-purity magnesium oxide.

In accordance with a second aspect of the present invention, there is provided a hydration-resistant magnesia powder consisting of particles having the surface covered with a continuous and uniform coating of silica.

In accordance with a third aspect of the present invention, this hydration-resistant magnesia powder is prepared according to a process comprising introducing a heated vapor of an organic silicate compound into a reactor of a fluidized bed of magnesia powder heated at 100° to 600° C. so that the concentration of the organic silicate compound is 1 to 20 mole %, and precipitating a coating of silica on the surfaces of magnesia particles by thermal decomposition and/or hydrolysis of the organic silicate compound on the surfaces of magnesia particles.

DESCRIPTION OF THE PREFERRED EMBODIMENTS

As the high-purity magnesium oxide valuably used in the present invention, there are preferably used monocrystalline magnesium oxide and magnesium oxide in which the total content of uranium and thorium is lower than 10 ppb.

Monocrystalline magnesium oxide prepared, for example, by heating metallic magnesium at a high temperature to vaporize magnesium and oxidizing the resulting gaseous magnesium with oxygen in the gas phase is preferably used. Monocrystalline magnesium oxide powder prepared according to this method has a very low content of impurities such as chlorine ion and bromine ion and is excellent in the dispersibility when kneaded with a resin. Moreover, this magnesium oxide powder is characteristic over silica in that the hardness is lower than the hardness of silica.

Furthermore, magnesium oxide can be prepared by sufficiently distilling metallic magnesium preferably so that the total content of radioactive elements such as uranium and thorium is reduced below 500 ppb, further evaporating the refined magnesium and oxidizing the highly purified magnesium with oxygen in the gas phase. In the so-obtained magnesium oxide, the total content of radioactive elements such as uranium and thorium is reduced below 10 ppb, preferably to the trace. When this magnesium oxide is used as a fuller, since the content of alkali metal ions such as $Na^+$ and $K^+$ and halogen ions such as $Cl^-$, which cause degradation of the moisture resistance of the resin and corrosion of an aluminum element, is very low, occurrence of these undesirable phenomena can be prevented. Accordingly, this magnesium oxide is especially preferred as a filler for the resin composition for sealing electronic parts according to the present invention.

In order to improve the kneading property with the resin, the filling property at the resin-sealing step and the thermal conductivity, it is preferred that the particle size distribution of the magnesium oxide be such that particles having a particle size larger than $40\mu$ occupy less than 10% by weight of the total particles, particles having a particle size of 1 to $40\mu$ occupy 80 to 90% by weight of the total particles and particles having a particle size smaller than $1\mu$ occupy less than 10% by weight of the total particles.

The resin composition for sealing electronic parts according to the present invention can be prepared by incorporating the above-mentioned magnesium oxide into a thermosetting resin, adding a curing agent and other additives to the mixture and uniformly blending or kneading the mixture by ordinary mixing and kneading means, such as melt-kneading in a vessel, melt-kneading by a roll or melt-kneading by an extruder.

As the mixing ratio of the magnesium oxide is increased, the thermal conductivity is proportionally increased but the flowability of the composition is reduced. If the amount of the magnesium oxide is too large, an electronic part cannot be completely sealed and many unfilled voids are formed, and there is a risk of reduction of the moisture resistance. Furthermore, when the resin is filled under a pressure, there is a risk of breaking of a weak portion of an electronic part, for example, a bonding wire connecting a semiconductor element to a lead portion. On the other hand, if the amount of the magnesium oxide is too small, the effect is too low and the intended object of the present invention cannot be attained. Therefore, it is preferred that the amount of the magnesium oxide be 10 to 85% by weight based on the total composition.

In the present invention, the above-mentioned magnesium oxide alone can be used as the filler, but an inorganic filler other than the magnesium oxide, for example, silica such as crystalline silica or fused silica, alumina, calcium carbonate or talc, can be used in combination with the magnesium oxide. When this inorganic filler is used, it is preferred that the total amount of the magnesium oxide and the inorganic filler be 15 to 85% by weight based on the total composition. If the total amount of the magnesium oxide and the inorganic filler is smaller than 15% by weight based on the total composition, the thermal expansion coefficient or the mechanical strength is insufficient and no good results can be obtained.

In the present invention, as the thermosetting resin, there can be used a variety of known thermosetting resins such as phenolic resins, silicone resins, epoxy resins and polyimide resins, and epoxy resins such as a cresol-novolak epoxy resin, a phenol-novolak epoxy resin, a bisphenol A type epoxy resin, a brominated phenol-novolak epoxy resin and an alicyclic epoxy resin are preferred. As the curing agent for the thermosetting resin, known curing agents can be used in the present invention. For example, there can be mentioned amine type curing agents such as diaminodiphenylmethane, diaminodiphenyl-sulfone and metaphenylene-diamine, acid anhydride type curing agents such as phthalic anhydride, pyromellitic anhydride and maleic anhydride, and novolak resin type curing agents such as a phenol-novolak resin and a cresol-novolak resin. A curing promoter such as imidazole, an imidazole derivative, a tertiary amine derivative or a phosphine derivative may be added. Moreover, a parting agent, a coupling agent, a flame retardant and the like may be added according to need.

In the resin composition for sealing electronic parts according to the present invention, $\alpha$-rays causing an error in a semiconductor element are not emitted, uranium or thorium is not substantially contained, the heat-dissipating property is excellent and the thermal conductivity is very high. Therefore, an industrially very valuable sealant can be provided according to the present invention.

The resin composition of the present invention is molded into an optional shape after incorporation of the respective components. Sealing of an electronic part with the resin composition of the present invention can be accomplished by known means such as cast molding, compression molding, transfer molding or injection molding.

It is particularly preferred that magnesium oxide to be used as a filler for the above-mentioned resin composition for sealing electronic parts be resistant to hydration. Therefore, in accordance with the present invention, there also are provided a hydration-resistant magnesia powder and a process for the preparation thereof.

In the present invention, various organic silicate compounds such as tetraethoxysilane, methyltriethoxysilane and ethyltriethoxysilane can be used as the starting organic silicate.

By advancing chemical adsorption of radical complexes formed by decomposition of the organic silicate compound on active sites on the surfaces of magnesia particles and/or condensation reaction between the OH groups left on the surfaces of the particles and the organic silicate compound, an organic substance-containing silica polymer is precipitated on the particles of the magnesia powder. By further thermal decomposition and/or hydrolysis of this organic substance-containing silica polymer, a dense and uniform coating of silica is precipitated on the particles of the magnesia powder. The thickness of this coating can be optionally controlled according to the amount of the organic silicate compound supplied into a fluidized bed reaction vessel, that is, the concentration of the gas of the organic silicate compound, and/or the reaction time.

The temperature of the fluidized bed reaction vessel is maintained at 100° to 600° C., preferably 350° to 450° C. If the temperature of the fluidized bed reaction vessel is lower than 100° C., the decomposition of the organic silicate compound is insufficient and a dense coating of silica cannot be formed on the magnesia particles. If the temperature of the fluidized bed reaction vessel is higher than 600° C., since the organic silicate compound is decomposed in the gas phase, silica powder is precipitated in the free state and the magnesia particles are not covered with silica in a good state. Moreover, if the temperature of the fluidized bed reaction vessel is lower than 100° C., physical adsorption of the organic silicate compound to the inner wall of the reaction vessel is caused, and if the temperature of the fluidized bed reaction vessel is higher than 600° C., a thin film of silica is precipitated on the inner wall of the reaction vessel by the chemical adsorption, and the thin film is peeled and incorporated into the magnesia powder or the peeled film disturbs the fluidization.

The concentration of the organic silicate compound in the gas supplied into the fluidized bed reaction vessel is 1 to 20 mole %, preferably 4 to 8 mole %. If the concentration is lower than 1 mole %, since the partial pressure of the organic silicate compound in the gas is too low, silica is hardly precipitated on the particles of the magnesia powder. If the concentration is higher than 20 mole %, the ratio of silica deposited on the particles of the magnesia powder to the total amount of the supplied organic silicate compound is lower than 10%, and the yield is drastically reduced and the process becomes economically disadvantageous. If the concentration of the organic silicate compound in the supplied gas is adjusted to 4 to 8 mole %, the above-mentioned ratio can be increased to 95% or higher.

If steam is simultaneously supplied in an amount of 0.1 to 20.0 moles per mole of the organic silicate compound supplied to the fluidized bed reaction vessel, the decomposition of the organic silicate compound is promoted and the ratio of the amount of silica deposited on the particles of the magnesia powder to the total amount of the supplied organic silicate compound can be increased to 99% or higher.

If the above-mentioned conditions of the present invention are adopted, by thermal decomposition and/or hydrolysis of the organic silicate compound, silica is selectively precipitated on the particles of the magnesia powder but is hardly precipitated on the inner wall of the reaction vessel. The reason is that the coating of silica is precipitated by the mutual action of the organic silicate compound with the active sites on the surfaces of the particles of the magnesia powder and/or the OH groups left on the surfaces of the particles of the magnesia powder, as pointed out hereinbefore.

Since complicated steps are not necessary for the process for the preparation of hydration-resistant magnesia powder according to the present invention, the preparation can be conducted in a discontinuous manner or a continuous manner.

Moreover, since an organic silicate compound is used as the starting material, the reaction temperature is relatively low and no corrosive gas is generated. Accordingly, hydration-resistant magnesia powder can be industrially advantageously prepared according to the present invention.

In accordance with the present invention, by incorporating high-purity magnesium oxide in a thermosetting resin, there can be provided an excellent resin composition for sealing electronic parts, which is distinguishable over the conventional compositions in that occurrence of an error in a memory element by radiations is prevented and the heat dissipating property is very good.

The hydration-resistant powder of the present invention is highly excellent in the hydration resistance and it can be used as a filler in various fields without hydration.

The hydration-resistant magnesia powder-preparing process of the present invention is advantageous over the conventional coupling treatment process in that complicated steps such as filtration, drying, rough pulverization and calcination are not necessary and magnesia powder having a high hydration resistance can be prepared at a low cost.

Furthermore, hydration-resistant magnesia powder having an average particle size within a broad range of 0.01 $\mu$m to scores of $\mu$m and a total content of uranium and thorium lower than 1 ppb can be provided.

The present invention will now be described in detail with reference to the following examples that by no means limit the scope of the invention.

REFERENTIAL EXAMPLE 1

This example illustrates the preparation of monocrystalline magnesium oxide.

An oxidation reaction vessel was charged with magnesium having a purity of 99.9%, which was gasified by heating at 900° C., and argon gas having a purity of 99.9% as a diluent so that the vapor pressure of magnesium was 0.04 atmosphere. Oxidation was carried out at 1000° C. while introducing oxygen gas having a purity of 99.9% into the reaction vessel, whereby monocrystalline magnesium oxide having a purity of 99.9%, in which the particle size was mainly within a range of 0.01 to 20 $\mu$, was obtained.

REFERENTIAL EXAMPLE 2

This example illustrates the preparation of magnesium oxide.

High-purity magnesium (in which the total content of uranium and thorium was 490 ppb) obtained by distillation purification of metallic magnesium was gasified by heating at 1150° C. and introduced into an oxidation reaction vessel, and argon gas having a purity of 99.9% was introduced as a diluent into the reaction vessel so that the vapor pressure of magnesium was 0.04 atmosphere. Oxidation was carried out at 1000° C. while introducing oxygen gas having a purity of 99.9% into the reaction vessel. During the oxidation, the formed magnesia fine particles were circulated and fusion growth was effected in an oxidative flame to obtain magnesium oxide having a purity of 99.99%, in which the total content of uranium and thorium was 0.7 ppb.

The particle size distribution of the obtained magnesium oxide was as follows.

Particles having a particle size smaller than 1 $\mu$: 8% by weight

Particles having a particle size of 1 to 40 $\mu$: 86% by weight

Particles having a particle size larger than 40 $\mu$: 6% by weight

EXAMPLE 1

A mixture comprising 198 parts by weight of an o-cresol-novolak epoxy resin (having an epoxy equivalent of 214 and a softening point of 84° C.), 22 parts by weight of a brominated phenol-novolak epoxy resin (having an epoxy equivalent of 275 and a softening point of 84° C.), 110 parts by weight of a phenolic resin (having a softening point of 80° C.), 33 parts by weight of antimony trioxide, 826 parts by weight of the monocrystalline magnesium oxide obtained in Referential Example 1, 4 parts by weight of 2-ethyl-4-methylimidazole, 4 parts by weight of carnauba wax and 4 parts by weight of a silane coupling agent (A-187 supplied by Nippon Unicar) was melt-kneaded at 80° to 100° C. by a two-roll mixer and was then pulverized to obtain a resin composition for sealing electronic parts.

EXAMPLE 2

A molding material was prepared in the same manner as described in Example 1 except that instead of 826 parts by weight of the monocrystalline magnesium oxide used in Example 1, there were used 413 parts by weight of the same monocrystalline magnesium oxide and 413 parts by weight of fused silica (RD-8 supplied by Tatsumori-sha).

EXAMPLE 3

A molding material was prepared in the same manner as described in Example 1 except that instead of 826 parts by weight of the monocrystalline magnesium oxide used in Example 1, there was used 826 parts by weight of the magnesium oxide obtained in Referential Example 2.

EXAMPLE 4

A molding material was prepared in the same manner as described in Example 3 except that 600 parts by weight of the magnesium oxide was used instead of 826 parts by weight of the magnesium oxide.

COMPARATIVE EXAMPLE 1

A molding material was prepared in the same manner as described in Example 1 or 3 except that 826 parts by weight of fused silica obtained by fusing natural siliceous stone was used instead of the magnesium oxide used in Example 1 or 3.

COMPARATIVE EXAMPLE 2

A molding material was prepared in the same manner as described in Example 1 or 3 except that 826 parts by weight of magnesium oxide obtained by pulverizing sea water magnesia clinker, which had a total uranium and thorium content of 210 ppb and had such a particle size distribution that particles having a size larger than 40μ occupied 2% by weight of the total particles, particles having a size of 1 to 40μ occupied 50% by weight of the total particles and particles having a size smaller than 1 μ occupied 48% by weight of the total particles, was used instead of 826 parts by weight of the magnesium oxide used in Example 1 or 3.

The characteristics of the so-obtained resin compositions for sealing electronic parts were evaluated.

More specifically, the resin compositions obtained in Examples 1 through 4 and Comparative Examples 1 and 2 were molded according to the transfer molding method and the characteristics of the molded products were evaluated. The obtained results are shown in Tables 1 and 2.

It is seen that the molded products obtained in Examples 1 and 2 are characteristic over the molded product obtained in Comparative Example 1 in the point that the abrasion loss of the metal by rubbing with metal is small and the molded article has a high thermal conductivity. It also is seen that the molded articles obtained in Examples 1 and 2 are satisfactory in electric and mechanical characteristics.

Furthermore, it is seen that the molded articles obtained in Examples 3 and 4 are characteristic over the molded articles obtained in Comparative Examples 1 and 2 in that the total uranium and thorium content is extremely low, the α-ray intensity is low and the thermal conductivity is high. It also is seen that the molded articles obtained in Examples 3 and 4 are satisfactory in electric and mechanical characteristics.

TABLE 1

|  | Example 1 | Example 2 | Comparative Example 1 |
|---|---|---|---|
| Thermal Conductivity ($10^{-4}$ cal/c · sec · °C.) | 45 | 29 | 14 |
| Flexural Strength (Kg/mm$^2$) | 12.1 | 12.8 | 13.0 |
| Volume Resistivity (Ω-cm) | $4.8 \times 10^{17}$ | $6.0 \times 10^{15}$ | $8.0 \times 10^{15}$ |
| Abrasion Metal Amount* (mg) | 0.02 | 0.04 | 0.06 |

*the abrasion amount of the metal when the molded article was rubbed with a metal sheet having a contact area of 5 cm$^2$ $10^4$ times

TABLE 2

|  | Example 3 | Example 4 | Comparative Example 1 | Comparative Example 2 |
|---|---|---|---|---|
| Uranium and Thorium Content (ppb) | 0.5 | 0.4 | 65 | 150 |
| α-Ray Intensity (α · cm$^{-2}$ · h$^{-1}$) | below 0.0001 | below 0.0001 | 0.06 | 0.14 |
| Thermal Conductivity ($10^{-4}$ cal/cm · sec · °C.) | 45 | 37 | 14 | 36 |
| Flexural Strength (Kg/mm$^2$) | 12.1 | 11.5 | 13.0 | 11.8 |
| Volume Resistivity (Ω-cm) | $4.2 \times 10^{17}$ | $3.0 \times 10^{16}$ | $8.0 \times 10^{15}$ | $8.2 \times 10^{16}$ |

EXAMPLE 5

In a fluidized bed reaction vessel heated at 400° C., 100 g of magnesia powder prepared by gas phase oxidation of heated vapor of metallic magnesium and having an average particle size of 0.055 μm was fluidized, and heated vapor of tetraethoxysilane was supplied into the reaction vessel together with entrained air and reaction was conducted for 1 hour. The tetraethoxysilane concentration in the feed gas was 7 mole % and the total gas flow rate was 3.7 l/min. When the molar ratio of silica deposited on the magnesia particles SiO$_2$/(MgO+SiO$_2$) molar ratio was determined, it was found that this molar ratio was 13.9 mole %. If the thickness of the silica coating was calculated from this amount, it was found that the thickness was 3.5 nm.

The so-prepared hydration-resistant magnesia powder was dispersed in concentrated hydrochloric acid and allowed to stand in this state for one week, whereby only the interior magnesia particles were dissolved out. When the residual silica was observed by an electron microscope, hollow shell-like particles were found. Thus, it was confirmed that the particles of the magnesia powder were covered with a very uniform coating of silica.

The hydration resistance test of the obtained hydration-resistant magnesia powder was carried out in the following manner. In 200 cc of distilled water was dispersed 5 g of the powder, and the dispersion was stirred at 25° C. for 5 or 72 hours or at 100° C. for 24 hours, and the dispersion was filtered and the recovered solid was dried at 105° C. for 5 hours. With respect to the obtained powder, the ignition loss was measured according to JIS R-5202 and the identification was carried out by an X-ray diffractometer (Model MINI FLEX D-3F supplied by Rigaku Denki). The obtained results are shown in Table 3.

EXAMPLE 6

Hydration-resistant magnesia powder was prepared in the same manner as described in Example 5 except that the average particle size of the magnesia powder before coating with silica was 0.016 μm. The amount of silica precipitated on the magnesia particles was 18.1 mole %, and the thickness of the silica coating calculated from this amount was 1.3 nm.

In the same manner as described in Example 5, it was confirmed that the magnesia particles were covered with a very uniform silica coating. Even though very fine magnesia powder having an average particle size of 0.016 μm were used as the starting material, the particles were not covered in the aggregated state, and the obtained powder had a very high dispersion degree.

The hydration resistance test of the obtained powder was carried out in the same manner as described in Example 5. The obtained results are shown in Table 3.

EXAMPLE 7

Hydration-resistant magnesia powder was prepared in the same manner as described in Example 5 except that the temperature of the fluidized bed reaction vessel was changed to 200° C. The amount of silica precipitated on the magnesia particles was 2.3 mole %, and the thickness of the silica coating calculated from this amount was 0.6 nm.

The hydration resistance test of the obtained powder was carried out in the same manner as described in Example 5. The obtained results are shown in Table 3.

EXAMPLE 8

Hydration-resistant magnesia powder was prepared in the same manner as described in Example 5 except that steam in an amount equimolar to tetraethoxysilane was simultaneously supplied into the fluidized bed reaction vessel. The amount of silica deposited on the magnesia particles was 18.5 mole %. Although the amount of tetraethoxysilane was equal to that in Example 5, the amount of silica deposited on the magnesia particles was increased in this example.

The hydration resistance test of the powder was carried out in the same manner as described in Example 5. The obtained results are shown in Table 3.

EXAMPLE 9

Hydration-resistant magnesia powder was prepared in the same manner as described in Example 5 by using granular magnesia having a total uranium and thorium content of 0.8 ppb and an average particle size of 18.2 μm, which was obtained by circulating magnesia fine particles, formed by gas phase oxidation of a heated vapor of metallic magnesium, in an oxidative flame to effect fusion growth. The reaction time was changed to 10 minutes. The amount of silica deposited on the magnesia particles was 1.9 mole %, and the thickness of the silica coating calculated from this amount was 0.2 μm. The hydration resistance test of the so-obtained hydration-resistant magnesia powder was carried out in the same manner as described in Example 5. The obtained results are shown in Table 3.

Incidentally, the total uranium and thorium content of the used tetraethoxysilane was lower than 0.05 ppb, and the tetraethoxysilane was highly pure. Accordingly, the obtained hydration-resistant magnesia fine powder had a total uranium and thorium content of 0.8 ppb. Therefore, when this powder was used as a semiconductor sealing material, an error by radiations from uranium and thorium could be avoided.

COMPARATIVE EXAMPLE 3

Hydration-resistant magnesia powder was prepared in the same manner as described in Example 5 except that the temperature of the fluidized bed reaction vessel was changed to 90° C. The amount of silica deposited on the magnesia particles was 0.1 mole %, and a continuous and uniform coating was not precipitated on the magnesia particles.

The hydration resistance test of the powder was carried out in the same manner as described in Example 5. The obtained results are shown in Table 3.

COMPARATIVE EXAMPLE 4

Hydration-resistant magnesia powder was prepared in the same manner as described in Example 5 except that the tetraethoxysilane concentration in the gas supplied to the fluidized bed reaction vessel was changed to 0.5 mole %. The amount of silica deposited on the magnesia particles was smaller than 0.1 mole %, and a continuous and uniform coating of silica was not precipitated on the magnesia particles.

The hydration resistance test of the powder was carried out in the same manner as described in Example 5. The obtained results are shown in Table 3.

COMPARATIVE EXAMPLE 5

Hydration-resistant magnesia powder was prepared in the same manner as described in Example 5 except that the tetraethoxysilane concentration in the gas supplied into the fluidized bed reaction vessel was changed to 22 mole %. The amount of silica deposited on the magnesia particles was 13.5 mole % and almost equal to the amount of deposited silica in Example 5, though the amount of supplied tetraethoxysilane was more than 3 times the amount of tetraethoxysilane supplied in Example 5. Accordingly, the process was economically disadvantageous.

COMPARATIVE EXAMPLE 6

The hydration resistance test of magnesia powder having an average particle size of 0.055 μm, which was obtained by gasphase oxidation of a vapor of metallic magnesium, was carried out in the same manner as described in Example 5. The obtained results are shown in Table 3.

COMPARATIV4E EXAMPLE 7

The hydration resistance test of magnesia powder having an average particle size of 0.016 μm, which was obtained by gas phase oxidation of a vapor of metallic magnesium, was carried out in the same manner as described in Example 5. The obtained results are shown in Table 3.

COMPARATIVE EXAMPLES 8 THROUGH 13

The magnesia powder used in Referential Example 3 was subjected to the coupling treatment with 3-aminopropyl-triethoxysilane (Comparative Example 8), phenylmethoxysilane (Comparative Example 9), 3-methacryloxypropyltrimethoxysilane (Comparative Example 10), methyltrimethoxysilane (Comparative Example 11), silicone oil (Comparative Example 12) or hexamethyldisilazane (Comparative Example 13) according to the known method.

With respect to each of the treated powders, the hydration resistance test was carried out in the same manner as described in Example 5. The obtained results are shown in Table 3.

ethoxysilane, oxygen and nitrogen gases were 7%, 19% and 74% by volume. The tetraethoxysilane used above was prepared by redistillation and had a purity of 99.9% and a total U and Th content of not more than 0.05 ppb.

TABLE 3

|  | After 5 Hours' Stirring in Water at 25° C. | | | After 72 Hours' Stirring in Water at 25° C. | | | After 24 Hours' Stirring in Hot Water at 100° C. | | |
|---|---|---|---|---|---|---|---|---|---|
|  | Ignition Loss | X-Ray Diffractometry* | | Ignition Loss | X-Ray Diffractometry* | | Ignition Loss | X-Ray Diffractometry* | |
|  | (%) | MgO | Mg(OH)$_2$ | (%) | MgO | Mg(OH)$_2$ | (%) | MgO | Mg(OH)$_2$ |
| Example 5 | 1.4 | ◎ | x | 1.8 | ◎ | x | 2.0 | ◎ | x |
| Example 6 | 2.5 | ◎ | x | 2.9 | ◎ | x | 3.0 | ◎ | x |
| Example 7 | 1.8 | ◎ | x | 2.1 | ◎ | x | 10.9 | ◎ | Δ |
| Example 8 | 1.1 | ◎ | x | 1.5 | ◎ | x | 1.5 | ◎ | x |
| Example 9 | 0.1 | ◎ | x | 0.1 | ◎ | x | 0.1 | ◎ | x |
| Comparative Example 3 | 30.1 | x | ◎ | 30.8 | x | ◎ | 32.2 | x | ◎ |
| Comparative Example 4 | 31.5 | x | ◎ | 32.0 | x | ◎ | 32.1 | x | ◎ |
| Comparative Example 6 | 32.8 | Δ | ◎ | 33.0 | x | ◎ | 33.0 | x | ◎ |
| Comparative Example 7 | 35.1 | x | ◎ | 35.3 | x | ◎ | 35.2 | x | ◎ |
| Comparative Example 8 | 27.1 | Δ | ◎ | 30.8 | x | ◎ | 32.2 | x | ◎ |
| Comparative Example 9 | 26.8 | Δ | ◎ | 31.6 | x | ◎ | 33.8 | x | ◎ |
| Comparative Example 10 | 28.8 | Δ | ◎ | 32.8 | x | ◎ | 31.5 | x | ◎ |
| Comparative Example 11 | 29.5 | Δ | ◎ | 34.1 | x | ◎ | 32.1 | x | ◎ |
| Comparative Example 12 | 25.5 | Δ | ◎ | 30.0 | Δ | ◎ | 34.1 | x | ◎ |
| Comparative Example 13 | 20.1 | Δ | ◎ | 29.6 | Δ | ◎ | 33.0 | x | ◎ |

Note
In the results of the measurement of the X-ray diffractometry, mark "◎" indicates the main component, mark "Δ" indicates the minute amount component, and mark "x" indicates no detection.

In the foregoing examples, tetraethoxysilane was used, but when organic silicate compounds other than tetraethoxysilane were used, the reaction could be similarly carried out, and similar results were obtained. However, in case of some organic silicate compounds, if oxygen is present in an atmosphere of the reaction vessel, decomposition is promoted by oxidation and silica powder alone is precipitated in the gas phase. Accordingly, in this case, the atmosphere of nitrogen or argon should be adopted.

REFERENTIAL EXAMPLE 3

100 g of magnesium oxide powder prepared by the same procedure as in Referential Example 2 was fluidized in a fluidized bed reaction vessel heated at 400° C., and heated vapor of tetraethoxysilane was supplied into the reaction vessel together with oxygen gas of a purity of 99.9% and nitrogen gas of a purity of 99.9% over the course of 10 minutes to obtain hydration-resistant magnesia powder. The proportions of the respective tetra- When the amount of silica deposited on the obtained hydration-resistant magnesia particles was determined, it was proved that the molar ratio of $SiO_2/(MgO+SiO_2)$ was 13.9 mole %. From this amount, a thickness of the silica coating of 0.2 nm was calculated. The total content of U and Th was 0.7 ppb, which proved that U and Th were not incorporated into the magnesia powder in the fluidized bed reaction vessel.

EXAMPLE 10

The procedure of Example 1 or 3 was repeated except that the magnesium oxide was replaced by the same amount of the hydration-resistant magnesia powder obtained in Referential Example 3.

EXAMPLE 11

A molding material was prepared in the same manner as described in Example 10 except that the hydration-resistant magnesia powder was used in an amount of 600 parts by weight instead of 826 parts by weight.

TABLE 4

|  | Before Autoclave Treatment | | | | After Autoclave Treatment | | | |
|---|---|---|---|---|---|---|---|---|
|  | Example | | Comparative Example | | Example | | Comparative Example | |
|  | 10 | 11 | 1 | 2 | 10 | 11 | 1 | 2 |
| Uranium and Thorium Content (ppb) | 0.5 | 0.4 | 65 | 150 | 0.5 | 0.4 | 65 | 150 |
| α-Ray Intensity (α · cm$^{-2}$ · h$^{-1}$) | below 0.0001 | below 0.0001 | 0.06 | 0.14 | below 0.0001 | below 0.0001 | 0.06 | 0.14 |
| Thermal Conductivity ($10^{-4}$ cal/cm · sec · °C.) | 44 | 36 | 14 | 36 | 43 | 36 | 12 | 18 |
| Flexural Strength (kg/mm$^2$) | 12.1 | 11.5 | 13.1 | 11.8 | 12.0 | 11.5 | 13.0 | 8.1 |

TABLE 4-continued

| | Before Autoclave Treatment | | | | After Autoclave Treatment | | | |
|---|---|---|---|---|---|---|---|---|
| | Example | | Comparative Example | | Example | | Comparative Example | |
| | 10 | 11 | 1 | 2 | 10 | 11 | 1 | 2 |
| Volume Resistivity (Ω·cm) | $3.9 \times 10^{17}$ | $3.0 \times 10^{16}$ | $8.0 \times 10^{15}$ | $8.2 \times 10^{16}$ | $3.8 \times 10^{17}$ | $2.9 \times 10^{16}$ | $7.7 \times 10^{15}$ | $5.5 \times 10^{13}$ |

We claim:

1. A hydration-resistant magnesia powder consisting of particles of magnesia having the surface covered with a continuous and uniform coating of silica.

2. A process for the preparation of a hydration-resistant magnesia powder, which comprises introducing a heated vapor of an organic silicate compound into a reactor of a fluidized bed of magnesia powder heated at 100° to 600° C. so that the concentration of the organic silicate compound is 1 to 20 mole %, and precipitating a coating of silica on the surfaces of magnesia particles by thermal decomposition and/or hydrolysis of the organic silicate compound on the surfaces of magnesia particles.

3. A process according to claim 2, wherein the temperature of the fluidized bed reactor is 350° to 450° C.

4. A process according to claim 2, wherein the concentration of the heated vapor of the organic silicate compound is 4 to 8 mole %.

5. A process according to claim 2, wherein steam is supplied together with the vapor of the organic silicate compound.

6. A process according to claim 5, wherein steam is supplied in an amount of 0.1 to 20.0 moles per mole of the organic silicate compound.

* * * * *